Patented June 27, 1939

2,164,089

UNITED STATES PATENT OFFICE 2,164,089

METHOD OF STABILIZING POTASSIUM IODIDE

John B. Shumaker, Des Moines, Iowa

No Drawing. Application February 17, 1938, Serial No. 191,025

2 Claims. (Cl. 23—243)

My process relates to the stabilization of comminuted potassium iodide in a suspended colloidal solution in which a protective cell is formed about each minute particle of the dispersed potassium iodide, preventing oxidation of the iodide.

The objects attained by my process are the segregated dispersion and protection of colloidal potassium iodide, the spraying of the colloidal iodide into an air suspended substance such as pulverized limestone, and the use of the protective agent about the individual particles of potassium iodide, as an adhesive surface, so that the potassium iodide particles will adhere to the individual particles of the material into which the solution is sprayed.

These and other objects will be apparent to those skilled in the art.

My process or method consists in the surrounding of minute particles of potassium iodide with a protective cell for mixing the iodide with other materials as hereinafter more fully set forth and pointed out in my claims.

Previously, it has been the practice, upon mixing potassium iodide or the like with powdered materials such as limestone, to mix the powders dry or to moisten the potassium iodide and spray it into the powdered limestone. This is very unsatisfactory, due to the fact that potassium iodide oxidizes very rapidly, causing a loss or volatilization of the iodide with a subsequent loss of efficiency of the complete mixture. Furthermore, it is difficult to cause the potassium iodide to disperse and evenly adhere to the particles of powdered limestone, causing a variation of ratio between the potassium iodide and limestone throughout the complete mixture. As powdered limestone with added potassium iodide is essential in the diet of animals, it is necessary that the potassium iodide be evenly distributed throughout the entire bulk of limestone. Inasmuch as as very small percentage of iodide relative to the limestone is used, it has been virtually impossible heretofore, to get the required dispersion and mixture of uniform ratio throughout. I have overcome such disadvantages of the prior methods or processes as is hereinafter more fully set forth.

When potassium iodide is mixed with powdered limestone, it will decompose through oxidation and, due to the presence of iron, manganese, and other mineral substance in the limestone, extraneous compounds will be formed with the iodide rendering it useless for the purpose desired in poultry and livestock feeds and the like. I have found that when small or colloidal particles of potassium iodide are coated with a film of oil in which is dissolved a suitable quantity of oil soluble agent, the particles are protected and the loss of free iodine is negligible. For a particular instance, I will take ninety-eight parts of light mineral oil, adding thereto, two parts of aluminum stearate.

This mixture is agitated and heated to approximately 100° C., at which temperature the aluminum stearate readily passes into solution with the oil.

Approximately equal parts of oil and potassium iodide, by weight, are mixed together and passed through a suitable mill, preferably a colloid mill should be used, however a paint mill is satisfactory. The mixed oil and potassium iodide may be run through the colloid mill at any suitable temperature so long as that temperature does not exceed the original temperature at which the aluminum stearate is introduced in the solution with the mineral oil.

By passing the potassium iodide, in oil solution, through the colloid mill, each individual colloid of potassium iodide will be surrounded by a protective coating of the oil and, due to the presence of the aluminum stearate, a thorough wetting of the colloid will result. This colloidal solution of potassium iodide may then be sprayed into air suspended, finely comminuted limestone and, due to the presence of the oil film or cell about the individual particles of potassium iodide, there will be a tendency for these colloids to adhere to the individual particles of powdered limestone or the like. Suspension and spraying of the base material or limestone is accomplished by introducing the limestone into a revolving blower type fan or the like through a screening aperture and while this limestone is in a state of air suspension the potassium iodide is sprayed through an atomizing nozzle into the suspension. This permits an atomized spray of colloidal potassium iodide to meet a suspension of finely comminuted limestone or the like. This permits a uniform dispersion of potassium iodide throughout the entire bulk of the limestone, as well as protecting the iodine content from oxidation or from entering a compound with the free minerals contained in the limestone. Any of the lighter grades of petrolatums, vegetable oils, animal oils or hydrogenated oil may be used satisfactorily and, for the oil soluble agent, any of the stearates or oleates thereof, may be satisfactorily used. I have found the best stearates to be the stearate of aluminum, magnesium, zinc or calcium.

I have also found that by pre-pulverizing or comminuting the potassium iodide and then adding it to the petroleum, having the stearate therein, the same ultimate result can be accomplished as is possible when running the mixture through a colloid mill.

Obviously, the quantity of aluminum stearate or other suitable wetting agent to be added to the oil will be directly determined by the nature of the oil employed and should be of a sufficient quantity to properly impregnate each colloidal particle of potassium iodide, protecting it against the possibility of chemical decomposition.

Thus, I have provided a process or method of stabilizing potassium iodide or the like that covers each individual particle with a protective film, that subdivides the particles so that a more uniform spread of a relatively small amount of the potassium iodide or like material may be had throughout a large quantity of other pulverized material. Furthermore, the protective film about each particle of the protected material creates a smooth flowing paste, lending itself to spraying or atomization. Also, this protective film adds further to the efficiency of a mixture by acting as an adhesive medium for attaching the protected particles to the individual dry particles of another material, making the completed mixture highly stable and uniform.

My process and method is particularly adapted to the process of adding a small quantity of potassium iodide to a relatively large quantity of limestone and assuring a uniform constant dispersion of the iodide throughout the bulk of the limestone.

Obviously, my process and method can be used wherever it is desired to create a mixture between a relatively small amount of a unstable compound and large amount of a more stable compound when uniform mixing of the two ingredients is desired.

Some variations may be made in the component elements used in my process or method of stabilizing potassium iodide without departing from the ultimate results obtained and it is my intention to cover in my claims any variations of proportions and composition which may be reasonably included within their scope.

I claim:

1. The process of dispersing potassium iodide through a mass of powdered limestone comprising, taking a quantity of oil, adding aluminum stearate to the oil, heating the mixture until the aluminum stearate dissolves in the oil, adding potassium iodide particles to the oil solution, milling the resulting mixture in a comminuting mill, suspending powdered limestone in air, and lastly spraying the mixture of potassium iodide, aluminum stearate and oil through the mass of the air suspended powdered limestone.

2. The process of dispersing a relatively small amount of potassium iodide throughout a mass of powdered air suspended limestone comprising, comminuting potassium iodide to colloidal form, mixing the potassium iodide with oil, and lastly spraying the resultant colloidal suspension of potassium iodide throughout the mass of air suspended limestone so that the oil coated colloidal particles of potassium iodide adhere evenly and uniformly to individual particles of powdered limestone.

JOHN B. SHUMAKER.